United States Patent
Ichimaru et al.

(10) Patent No.: US 7,597,130 B2
(45) Date of Patent: Oct. 6, 2009

(54) DOOR UNIT

(75) Inventors: Takahide Ichimaru, Utsunomiya (JP); Toru Matsui, Wako (JP); Masamitsu Shiono, Wako (JP)

(73) Assignees: Nifco Inc., Yokohama-shi, Kanagawa (JP); Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 11/206,119

(22) Filed: Aug. 18, 2005

(65) Prior Publication Data

US 2006/0037713 A1 Feb. 23, 2006

(30) Foreign Application Priority Data

Aug. 23, 2004 (JP) .............................. 2004-241959

(51) Int. Cl.
*E06B 3/32* (2006.01)

(52) U.S. Cl. ........................ 160/89; 160/37; 160/218; 160/230

(58) Field of Classification Search .............. 160/84.02, 160/102, 331, 89, 37, 179, 218, 230, 121.1, 160/106, 267.1, 273.1; 220/475, 630; 52/202, 52/3

See application file for complete search history.

(56) References Cited

U.S. PATENT DOCUMENTS

| | | | | |
|---|---|---|---|---|
| 675,955 A * | 6/1901 | Kinnear | ............... | 160/121.1 |
| 1,716,060 A * | 6/1929 | Hutchinson | ............ | 160/89 |
| 1,782,954 A * | 11/1930 | Bauer | ............... | 160/89 |
| 3,870,391 A * | 3/1975 | Nims | ............... | 312/297 |
| 5,921,435 A * | 7/1999 | Billet | ............... | 221/185 |
| 5,946,869 A * | 9/1999 | Zinbarg | ............ | 52/202 |
| 5,967,217 A * | 10/1999 | Wu | ............... | 160/331 |
| 5,988,476 A * | 11/1999 | Olerio | ............ | 224/630 |
| 6,053,235 A * | 4/2000 | Ruffner, Sr. | ......... | 160/89 |
| 6,092,319 A * | 7/2000 | Hicks | ............ | 40/603 |
| 6,282,822 B1* | 9/2001 | Rinzler et al. | ...... | 40/590 |
| 6,464,098 B1* | 10/2002 | Henson et al. | ...... | 220/475 |
| 6,550,551 B2* | 4/2003 | Brunnert et al. | ..... | 175/61 |
| 6,651,853 B2* | 11/2003 | Higgins et al. | ..... | 224/155 |
| 6,945,300 B2* | 9/2005 | Smith | ............ | 160/89 |
| 2003/0116997 A1* | 6/2003 | Lin | ............... | 296/214 |
| 2003/0127060 A1* | 7/2003 | Yeung | ............ | 119/497 |
| 2005/0252619 A1* | 11/2005 | Coenraets | ......... | 160/89 |

FOREIGN PATENT DOCUMENTS

DE 3743538 * 7/1989
JP 2003-90186 3/2003

* cited by examiner

*Primary Examiner*—Blair M. Johnson
(74) *Attorney, Agent, or Firm*—Manabu Kanesaka

(57) ABSTRACT

A door unit for selectively opening and closing an opening in an object includes a door having a bendable slatted door body and a flexible sheet member positioned over the door body. Guide grooves in the object slidably guide at least the door body, and the respective ends of the door body and the sheet member are connected on one end in the sliding direction. By setting an appropriate spacing between the guide grooves, the generation of noise that would otherwise be caused by the door body and the sheet member rubbing against each other when they are opened or closed, is avoided. The use of the separate sheet member also significantly increases the options for the material to be employed for the design surface of the door unit.

8 Claims, 12 Drawing Sheets

Fig. 14 ically allowing for
DOOR UNIT

BACKGROUND OF THE INVENTION AND RELATED ART STATEMENT

The present invention relates to a door unit for selectively opening and closing the opening of an object having at least one open surface.

As a conventional door unit for opening and closing the opening of an object, a unit that can be employed in a center console of a vehicle, for example, for opening and closing the opening of a storage unit disposed therein is available. In the case wherein the layout does not permit the arrangement of a housing section for the door in the extension of the open surface of the center console due to a curved section that exists in the middle, a bendable slatted shutter is employed for the door.

Patent reference 1: Japanese Patent Laid-open Publication No. 2003-90486

In the shutter described above, both side edges thereof are guided along the guide grooves disposed in the storage unit casing, and the shutter is formed of a synthetic resin material in a configuration that will enable the shutter to bend easily. In the case of creating a design surface for the shutter with a soft synthetic resin material, an uneven surface can be formed. By securing flexibility with concave sections and rigidity with convex sections, both good bending performance and rigidity can be achieved.

This, however, has a shortcoming of not easily allowing for an improvement to be made in the appearance, as the shape is restricted by the uneven design surface. In order to improve the design, a film, for example, can be pasted on the design surface. This, however, is not preferable because the film may be peeled off or distorted by the bending of the shutter.

The present invention has been made to solve these problems, and an object of the invention is to provide a door unit to improve its the design flexibility.

Further objects and advantages of the invention will be apparent from the following description of the invention.

SUMMARY OF THE INVENTION

In order to solve these problems and improve upon the design flexibility of the door of the door unit, the door unit in accordance with the present invention has a door (3/22) slidably disposed for selectively opening and closing the opening (2c/21b) disposed in one section of an object (2/21). The door (3/22) comprises a bendable slatted door body (11) and a flexible sheet member (12) laid over the door body (11) so as to be positioned on the surface side of the opening (2c/21b), the object (2/21) includes a guide groove (6a/6b/23) having a curved section disposed so as to slidably guide at least said door body (11), and the respective ends of said door body (11) and said sheet member (12) are connected on one end in the sliding direction.

It is particularly preferable to spring-bias said sheet member (12) with a spring means (18/24) so as to receive tension in the sliding direction at all times. Moreover, the aforementioned sheet member (12) may preferably be guided by a separate guide groove (6a) disposed independent of the aforementioned guide groove (6b) for guiding the door body (11). The spacing between the guides (6a and 6b) is preferably set so as to prevent the generation of noise that would otherwise be caused by the door body (11) and the sheet member (12) rubbing against each other, at least in the curved section of the opening (2c), when they are opened or closed.

In accordance with the present invention, the design surface for the uneven bendable slatted door body can be formed with a separate sheet member, and thus the sheet member enables the creation of a design surface without any restriction. For the flexible sheet member, an aluminum vapor-deposited sheet, for example, can be used. This significantly increases the options for the material to be employed for the design surface of the shutter door unit, and improves the design flexibility of the door surface.

Moreover, spring-biasing the sheet member in the sliding direction can prevent slack that otherwise would occur in the flexible sheet member. Thus, the design surface can be maintained in a good condition even when the flexible sheet member is disposed separately from the door body. By guiding the door body and the sheet member with separate guide grooves, in particular, the spacing between the two can be secured. This can prevent the design pattern of the relatively stiff slatted door body from appearing through the sheet member in the case in which the sheet member is thin. When the ends of the door body and the sheet member are connected on the same side, moreover, the difference in the peripheral distances of the guide groove may cause one member to shift relative to the other in the curved section. By setting the spacing between the two so that they won't rub against each other, the generation of a rustling noise or friction can be prevented.

DETAILED DESCRIPTION OF THE PREFERRED EMBODIMENTS

In the following, embodiments of the present invention will be explained with reference to the drawings.

Figure 1:
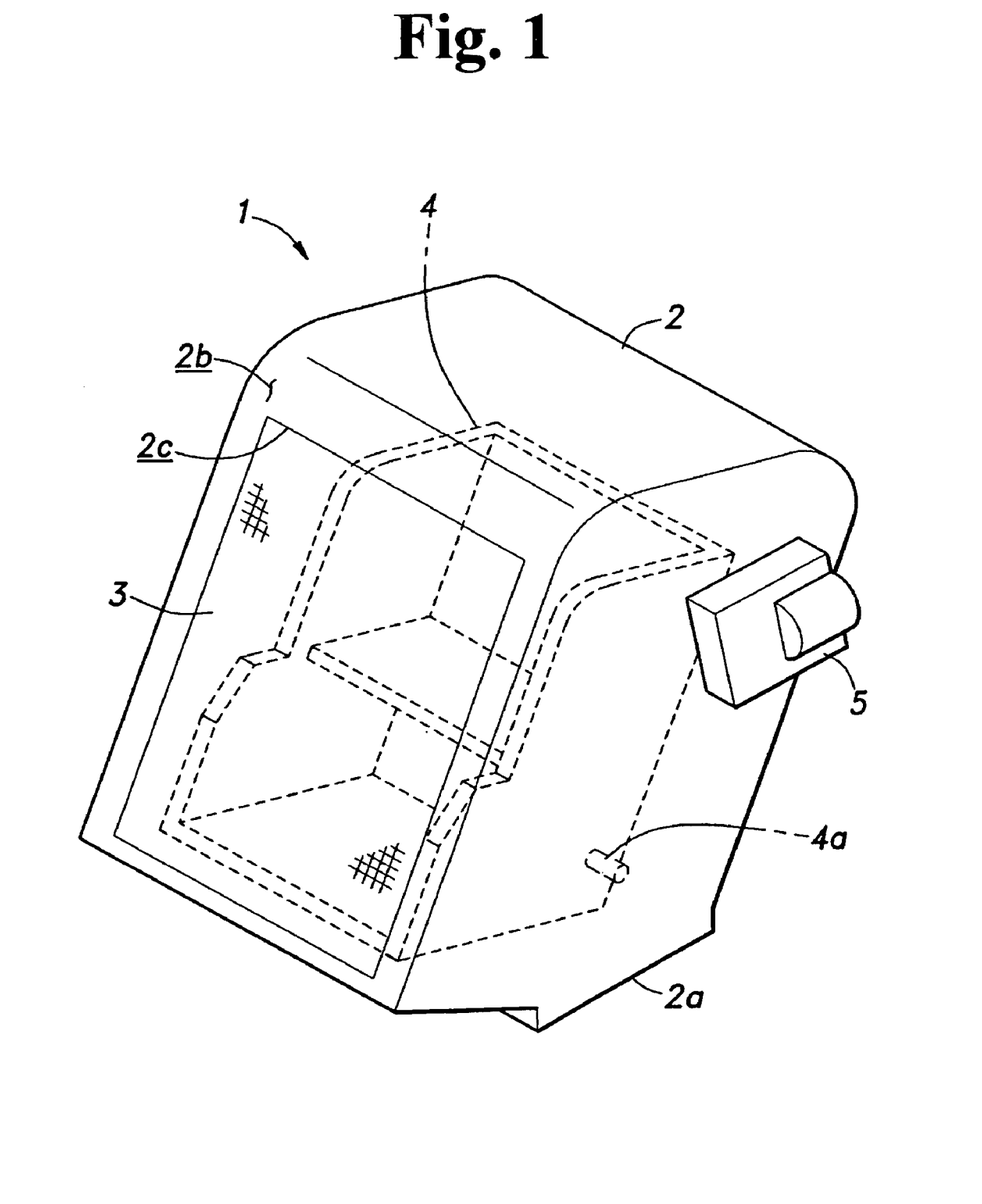
FIG. 1 is a full perspective view of the storage box to which the present invention is applied.

FIG. 1 is a full perspective view of the storage box 1 to which the present invention is applied, installed, for example, in the cabin of a vehicle. In the figure, the leg section 2a formed in the bottom surface of the rectangular box-shaped case 2 is screw mounted to a vehicle body frame in the appropriate location (not shown).

In the case 2, a rectangular opening 2c is formed in the surface 2b that is flush with the interior member of the vehicle cabin, and a door 3 is disposed to place the opening 2c in two states, i.e., the fully closed and fully opened states. In the interior of the case 2, an inner case 4 shaped so as to store CDs, for example, is installed. The inner case 4 is slidably supported by the guide rail (not shown) so as to assume two positions: an inner receiving position and an accessible position that is slightly projected from the opening 2c. In addition, a motor unit 5, which serves as a driver for automatically opening and closing the door 3, is disposed in an appropriate location within the case 2 (in the side surface in the embodiment shown in the figure).

Figure 2:
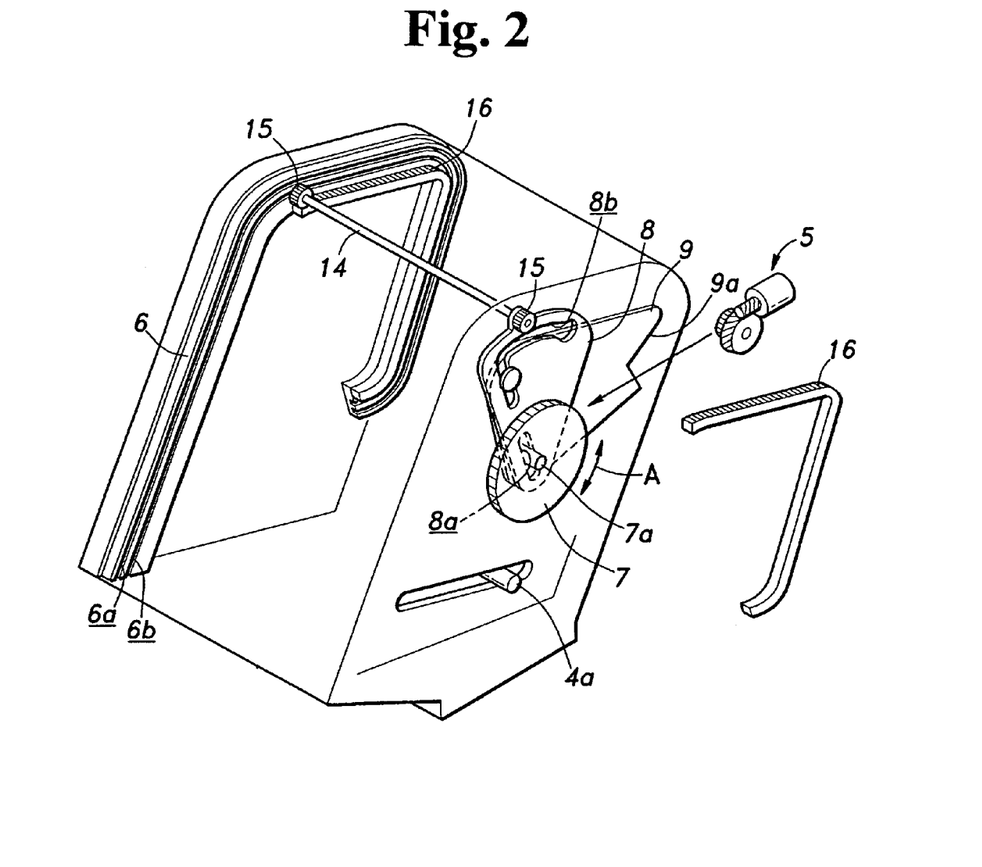
FIG. 2 is a partial exploded perspective view of the door unit based on the present invention.

As shown in FIG. 2, a pair of inverse "J"-shaped guide rails 6 are disposed symmetrically in the inner side surfaces of the case 2. Only one guide rail is shown in the figure (the other is omitted) In the guide rail 6, as also shown in FIG. 3, a narrow outer guide groove 6a and a wide inner guide groove 6b are formed, both disposed over the entire lengths while maintaining a predetermined spacing therebetween.

On either the right or left side of the case 2 (the forward side in FIG. 2), a main gear 7 driven by the aforementioned motor unit 5, a sector link plate 8, and a plate-shaped arm 9, which is substantially triangular in shape, are disposed. In the pertinent section of the sector link plate 8, a slot 8a is disposed so as to extend in the radial direction of the shaft 7a of the main gear 7. The shaft 7a passes through the slot 8a so as to guide the slot 8a.

The arm 9 is secured to the shaft 7a so as to turn integrally with the main gear 7 in the direction of arrow A indicated in FIG. 2. The link plate 8 is provided with an "L"-shaped guide slot 8b consisting of a section extending substantially radially and a section extending substantially circumferentially. A guide shaft 9a projects from the arm 9 into the "L"-shaped guide slot 8b; the engagement of the two allows the link plate 8 to turn in accordance with the rotation of the arm 9 in compliance with the shape of the "L"-shaped guide slot 8b.

Figure 3:
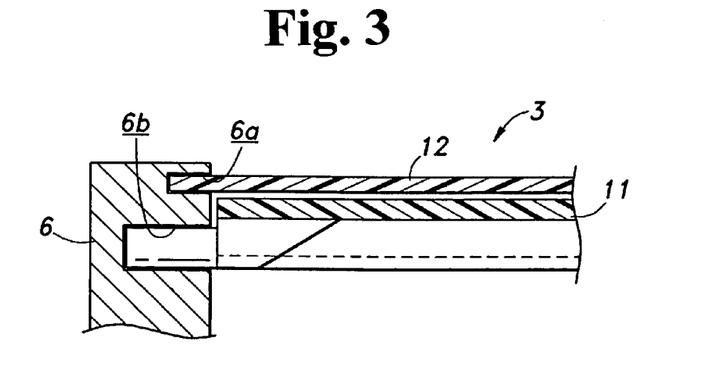
FIG. 3 is a partial enlarged sectional view showing the guide structure of the door.
Figure 4:
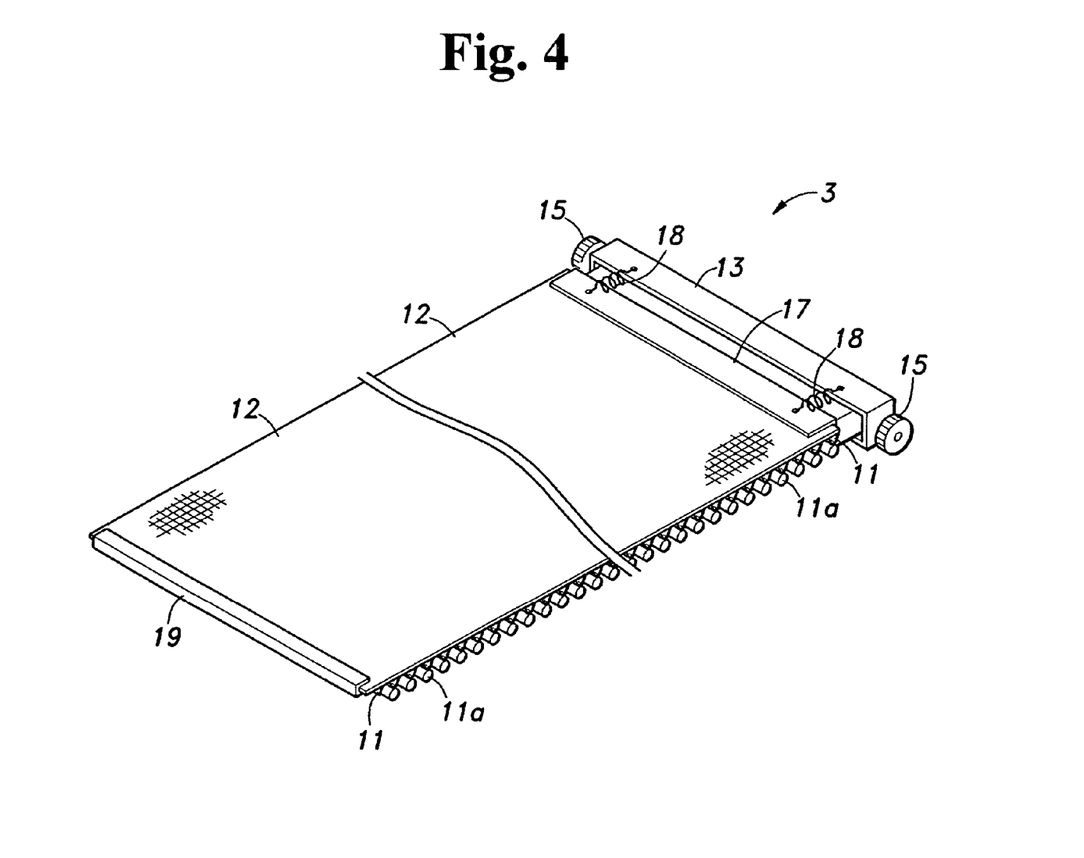
FIG. 4 is a full perspective view of the door.

The door 3, as shown in FIGS. 3 and 4, is composed of a shutter 11 as the bendable slatted door body, and a film sheet 12 as the flexible sheet member laid over on the surface side of the shutter 11. The shutter 11 may be of any generally slatted shutter structure comprising slats that can be rolled back. In the example shown in the figures, the shutter is formed with a synthetic resin material to form a plate as a whole having a continuous longitudinal uneven section. At one longitudinal end of the shutter 11, a flat recessed bracket 13 is attached. The bracket 13 supports a shaft 14 that extends widthwise, and a gear 15 is disposed at each end of the shaft 14. One end of the shaft 14 is supported by the aforementioned link plate 8. The end of the shutter 11 located on the side of the bracket 13 is inserted into the bracket 13. A shaft slot (omitted in the figure) is provided at the back where the shutter is inserted, through which the shaft 14 is inserted. The bracket 13 and shutter 11 are integrated in this manner.

A substantially "L"-shaped rack 16 is disposed symmetrically on both right and left sides so as to run along each of the aforementioned guide rails 6. As shown in FIG. 2, one of the racks 16 is disposed integrally with the guide rail 6, while the other rack 16 is disposed on the side (outer side of case 2) that faces the guide rail 6 (omitted in the figure) across the link plate 8 and the arm 9 that is interposed therebetween. The corresponding gears 15 engage with these racks 16.

Thus, as the link plate 8 turns in the direction of arrow A indicated in FIG. 2, the gears 15 are guided along the rack 16 to allow the bracket 13, i.e., the shutter 11, to move. The discrepancy in the tracks between the link plate 8 that is turned and the "L"-shaped rack 16 is absorbed by the slot 8a disposed in the link plate 8.

The sheet 12 overlaying the shutter 11 is a film member produced by vapor depositing aluminum, for example, on an ABS resin base material, and is formed so as to cover the entire surface of the shutter 11. A plate protector 17 is incorporated with the end of the sheet 12 on the side of the bracket 13, and, as a spring bias means, a pair of helical coil springs 18, for example, are installed between the protector 17 and the bracket 13. The sheet 12, therefore, is always spring-biased toward the bracket 13 via the helical coil springs 18. A connection member 19 is attached at the other end of the sheet 12 to join the sheet 12 and the shutter 11 so that the sheet 12 at that end is held straight. The connection member 19 may be of a synthetic resin sheet that is folded in a "U" shape so as to interpose the ends of both the sheet 12 and shutter 11.

As mentioned above, the shutter 11 has a longitudinally uneven section so as to secure the rigidity with the convex sections and the flexibility with the concave sections. At each widthwise extremity of the convex sections, a projecting shaft 11a is integrally formed to extend outward. These projecting shafts 11a are inserted into and guided along the inner guide grooves 6b. The shutter 11, therefore, can travel in compliance with the shapes of the guide rails 6.

The two widthwise edges of the sheet 12 are inserted into and guided along the outer guide grooves 6a. The sheet 12, therefore, also can travel in accordance with the shapes of the guide rails 6. As described above, the shutter 11 and the sheet 12 are joined as a unit via the bracket 13, and thus the shutter 11 and the sheet 12 can travel as a unit along the movement of the bracket 13.

Figure 5:
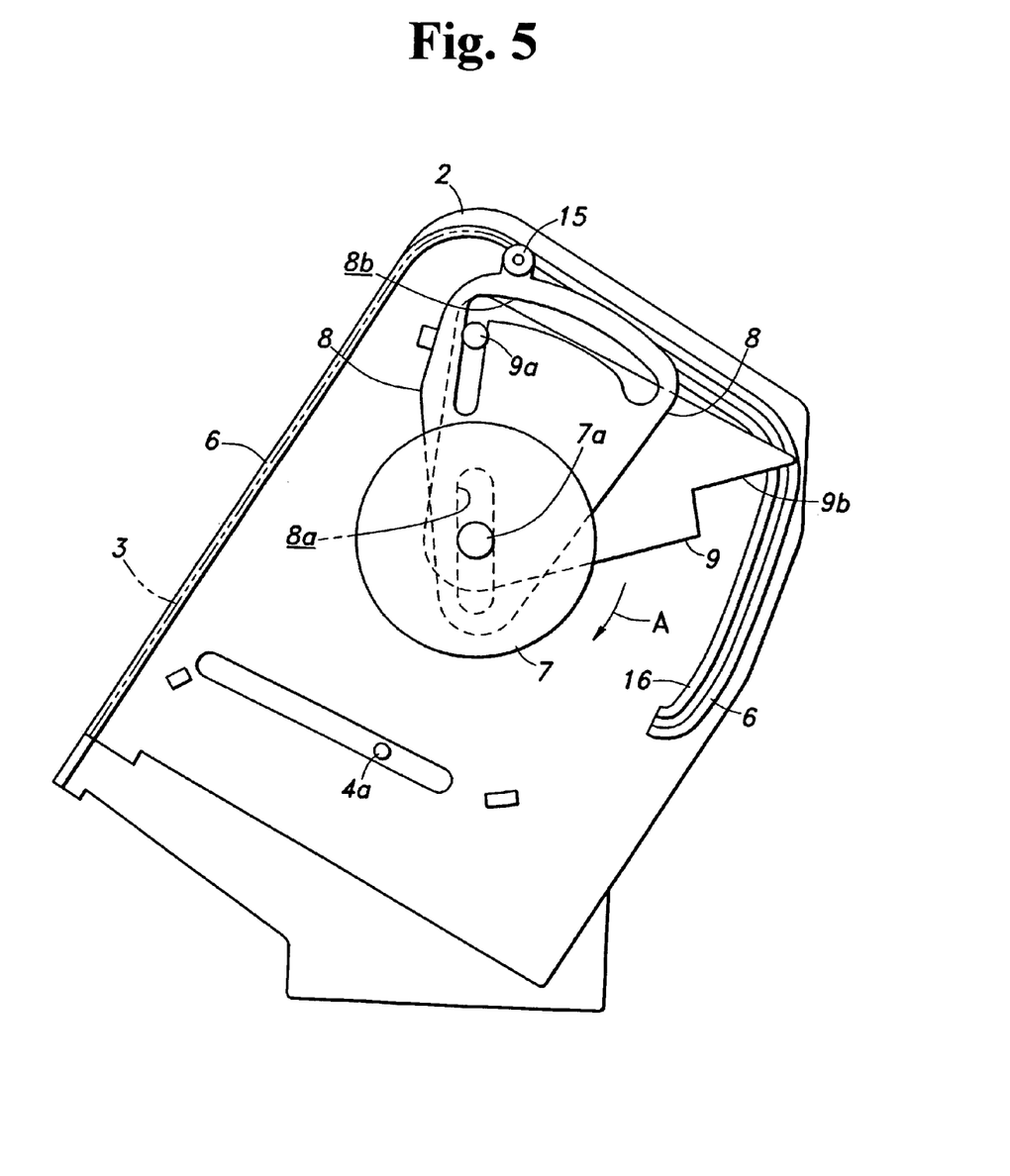
FIG. 5 is an explanatory diagram of the side surface of the door unit when fully closed.

Next, the operation of the storage box constructed as described above will be explained with reference to FIGS. 5-8. FIG. 5 shows the state of the door 3 when it is fully closed. For better understanding, certain components are drawn transparently or omitted. For example, in the figures, the guide rail 6 and rack 16 located in the back are shown, but not the forward ones.

When a user runs the motor unit 5 by operating a switch or the like to open the door 3 from the fully closed state shown in FIG. 5, the main gear 7 rotates in the direction indicated by arrow A, which also rotates the arm 9 in the direction of arrow A. Since the guide shaft 9a of the arm 9 is positioned in the substantially radially extending section of the "L"-shaped guide slot 8b in the fully closed state, the link plate 8 also rotates substantially integrally with the arm 9, and this moves the bracket 13, i.e., the door 3, in the opening direction.

Figure 6:
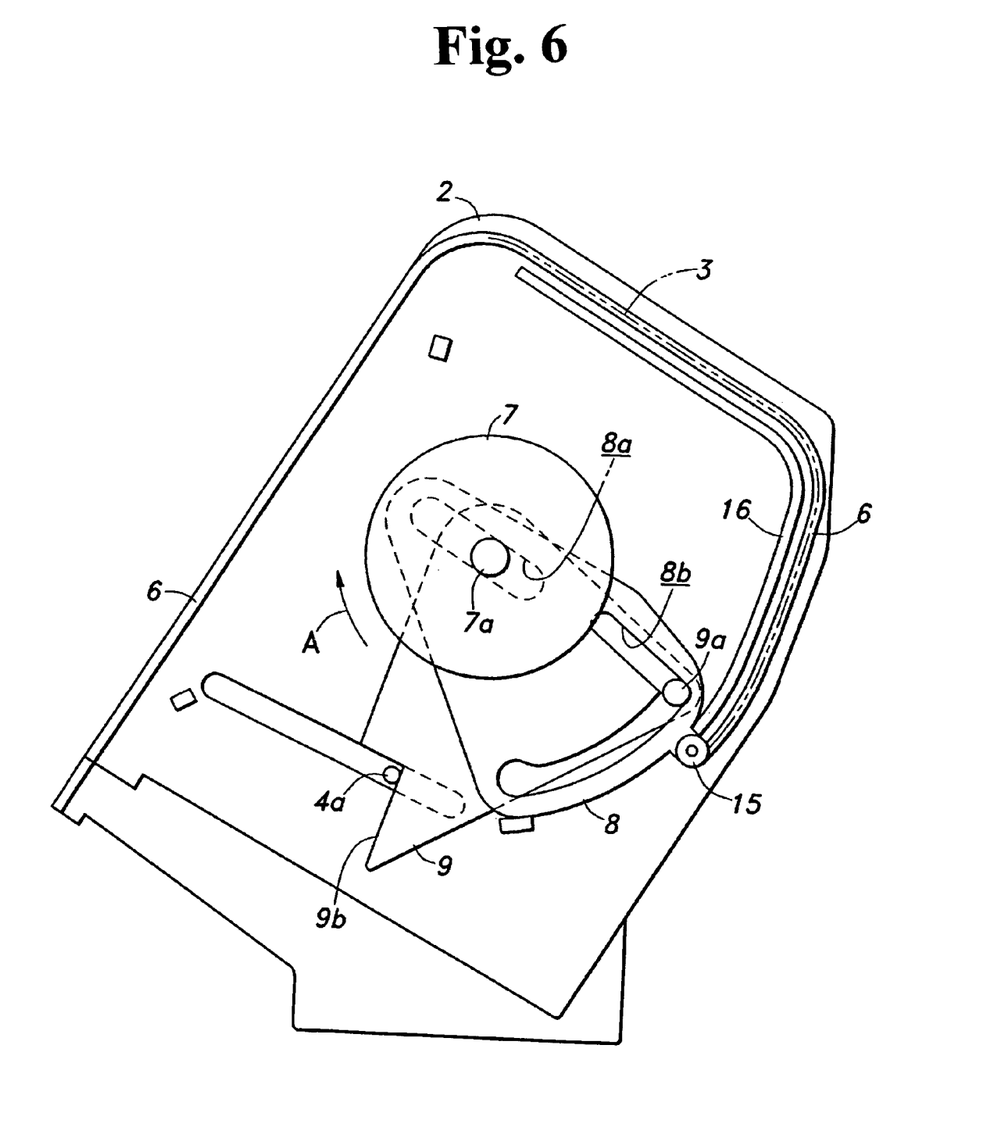
FIG. 6 is a diagram of the side surface of the door unit corresponding to FIG. 5 when fully opened.

The engagement between the aforementioned substantially radially extending section of the "L"-shaped guide slot 8b and the guide shaft 9a continues until the fully opened state, shown in FIG. 6, is achieved. At this time, the shutter 11 and the sheet 12 shift relative to one another due to the difference between the inner and outer peripheral distances of the guide rail 6 as they pass the curved section in compliance with the shape of the guide rail 6 having the curved section. Since the sheet 12 is spring-biased relative to the bracket 13 via the coil springs 18 as described above, this shifting can be absorbed, and thus the sheet 12 does not wrinkle. Since tension is always maintained on the sheet 12 that is laid over the shutter 11, the design on the surface of the door 3 made with the sheet 12 can be maintained in a good condition at all times.

Although the shutter 11 and the sheet 12 can travel in a synchronized manner in the straight section, the two shift relative to each other in the curved section as described above. If the two were disposed in contact with each other, this may cause them to rub against each other and generate frictional noise. For this reason, it is preferable to secure a predetermined amount of spacing between the guide grooves 6a and 6b so that the shutter 11 and sheet 12 do not rub against each other in the curved section. It is acceptable to form the two guide grooves 6a and 6b in spaced relation over the entire distances between the fully opened and fully closed positions, but it is also possible to set the aforementioned predetermined amount of spacing between the two guide grooves 6a and 6b only in the curved section.

Figure 7:
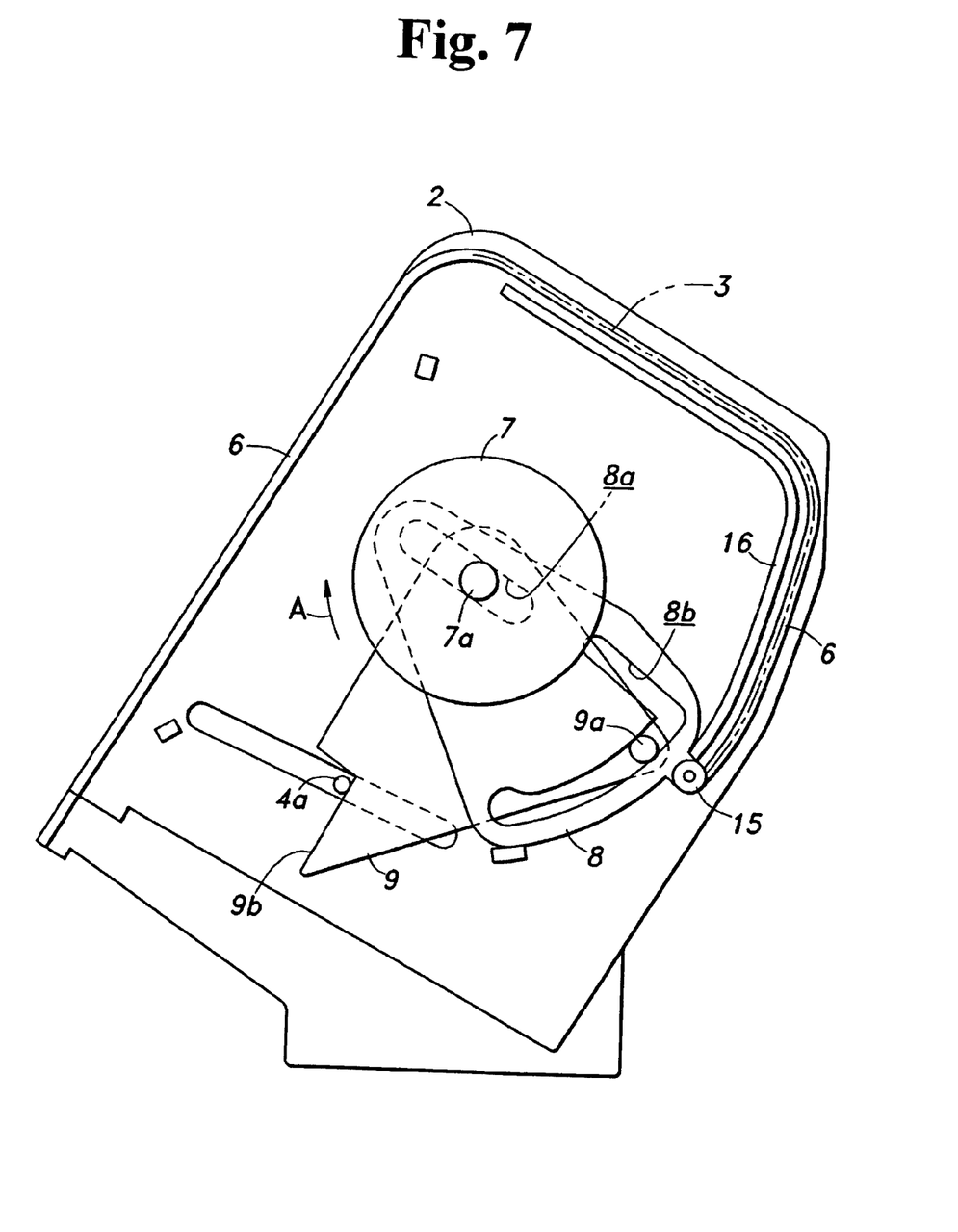
FIG. 7 is a diagram corresponding to FIG. 5 showing the initial stage of pushing the inner case out.

When the arm 9 further rotates from the fully open state shown in FIG. 6, the link plate 8 hits the stopper disposed in the case 2 and comes to a halt, as shown in FIG. 7, and, at this state, the guide shaft 9a moves to the circumferentially extending section of the "L"-shaped guide slot 8b. In this state, the link plate 8 is halted, and only the arm 9 keeps turning. Then, as shown in FIG. 7, the leading end 9b of the arm 9 engages with the rod 4a projecting from the side surface of the inner case 4.

Figure 8:
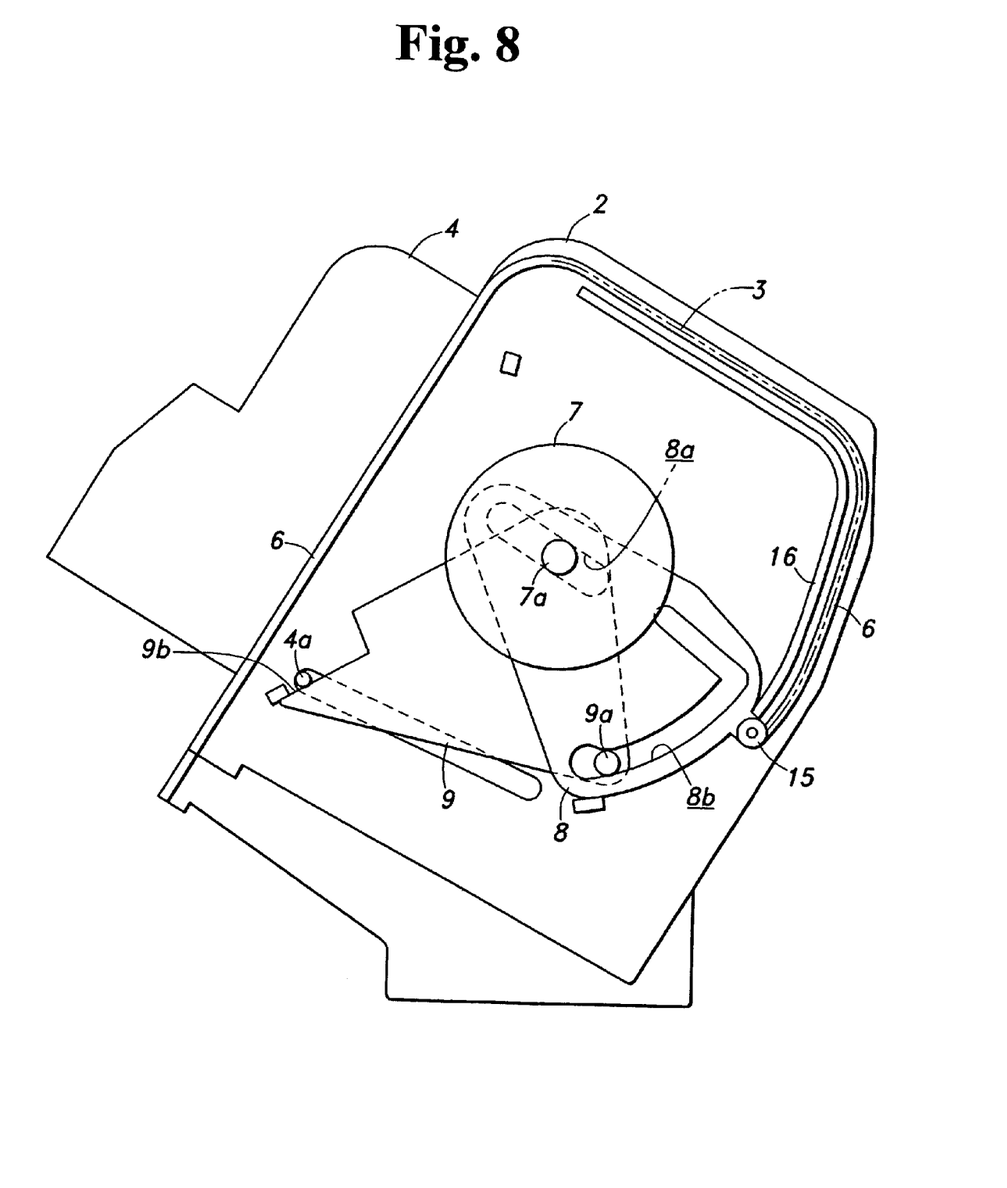
FIG. 8 is a diagram corresponding to FIG. 5 showing the inner case when fully pushed out.

Continued turning of the arm 9 causes its leading end 9b to push the rod 4a to push out the inner case 4 until the arm 9 abuts against the stopper disposed in the case (FIG. 8). At this time, the motor unit 9 must be turned off; this can be controlled by overload detection or detecting a position using a position sensor. In this manner, the CD cases or the like stored in the inner case 4 can be easily accessed, or CD cases or the like can be easily stored in the inner case 4.

To close the door with a switching operation by a user, the above operation can be performed in the reverse order by allowing the motor unit 5 to operate in reverse direction in accordance with the signal to close. In this case, the shutter 11 and the sheet 12 can also travel as a unit, and the sheet 12 can maintain the design on the surface of the door 3 in a good condition at all times as described above, since the sheet 12 is connected to the bracket 13 in a spring-biased condition.

As described above, the door 3 is divided into the shutter 11 and the sheet 12, wherein the flexibility and rigidity aspects are achieved by the shutter 11, while the diversity of design on the door surface is realized by the sheet 12. Since a film material can be employed for the sheet 12, the patterns and colors can be freely selected. This significantly improves the design flexibility of the door 3, as compared to a conventional door that comprises only an uneven surfaced shutter 11. Although the shutter 11 and the sheet 12 are connected at one end and resiliently connected at the other end in the example shown in the figures, the resilient connection can be eliminated, i.e., so as to allow the two members to have free ends. In that case, a flexible material having enough rigidity and thickness should be selected for the sheet 12 so that the sheet 12 won't wrinkle when it slides, free end first, as it is pushed by the connected end, not to mention the instances when it is pulled and slid in the direction toward the connected end.

Figure 9:
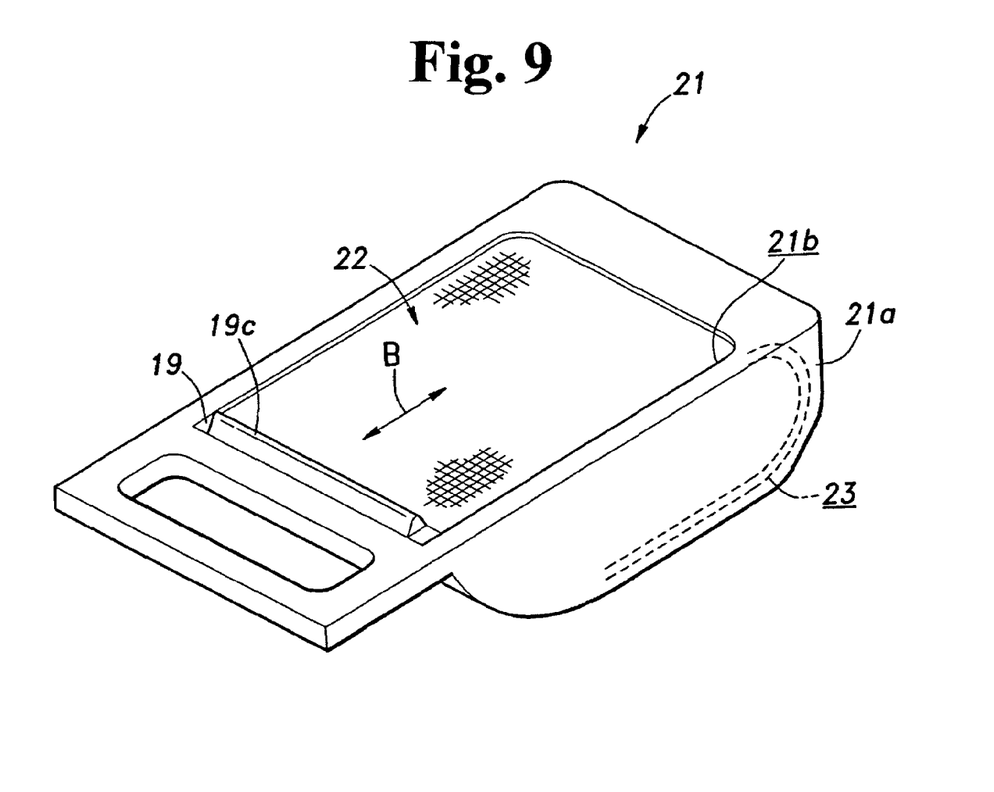
FIG. 9 is a full perspective view of the second embodiment of the present invention.

The second embodiment of the present invention will be explained next with reference to FIG. 9. FIG. 9 is a full perspective view of an accessory holder 21, which can be installed in a center console or the like of an automobile. The components that are the same as the previous embodiment are denoted by the same reference numerals, for which the detailed explanation is omitted.

When mounted in the center console (not shown), the container 21a is held within the center console, and the upper surface shown in the figure is exposed in the condition wherein it is flush with the upper surface of the console, for example. An opening 21b, similar to that in the previous embodiment, is formed in the upper surface of the accessory holder 21, and the opening 21b is opened and closed by the door 22. The door 22 in this second embodiment also comprises a shutter 11 and a sheet 12 laid over the surface of the shutter, as in the case of the previous embodiment.

Figure 10:
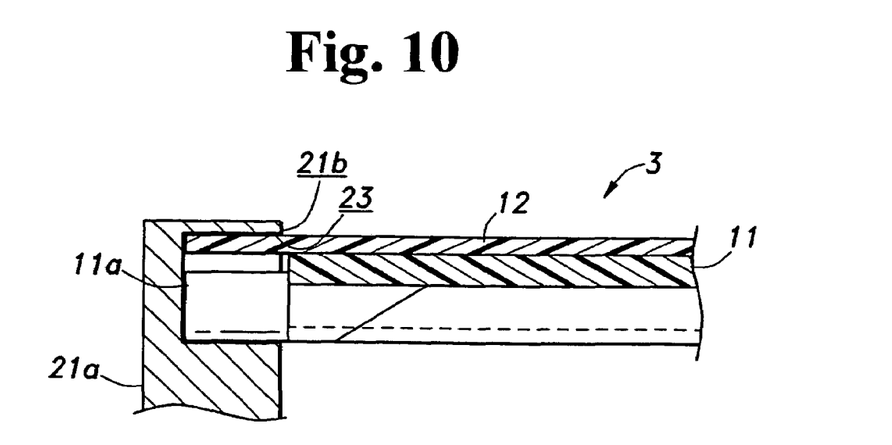
FIG. 10 is a view of the second embodiment, which corresponds to FIG. 3.

As shown in FIG. 10, a guide groove 23 is formed on each of the left and right side walls of the container 21a in the location corresponding to the opening 21b. In each said side wall, a single guide groove 23 is disposed to extend in the open-close direction of the door 22 (arrow B in FIG. 9), have a curved section to reverse the travel direction before the door reaches the bottom of the container 21a, and extend along the bottom surface. The side edges of both the shutter 11 and the sheet 12 are inserted into the single guide groove 23. Even in this configuration, the projecting shafts 11a of the shutter 11 are guided along the floor surface of the guide groove 23, while the edge of the sheet 12 is guided along the roof surface of the guide groove 23.

In the second embodiment, since the shutter 11 and the sheet 12 are guided by a single guide rail 23, no gap is formed between the two. However, the material and the thickness of the sheet 12 can be optimized to thereby prevent the unevenness of the shutter 11 from appearing through the sheet 12, even if they contact each other. At the same time, the rubbing noise can also be eliminated by appropriately selecting the materials for both members or treating the respective contact surfaces.

Figure 11:
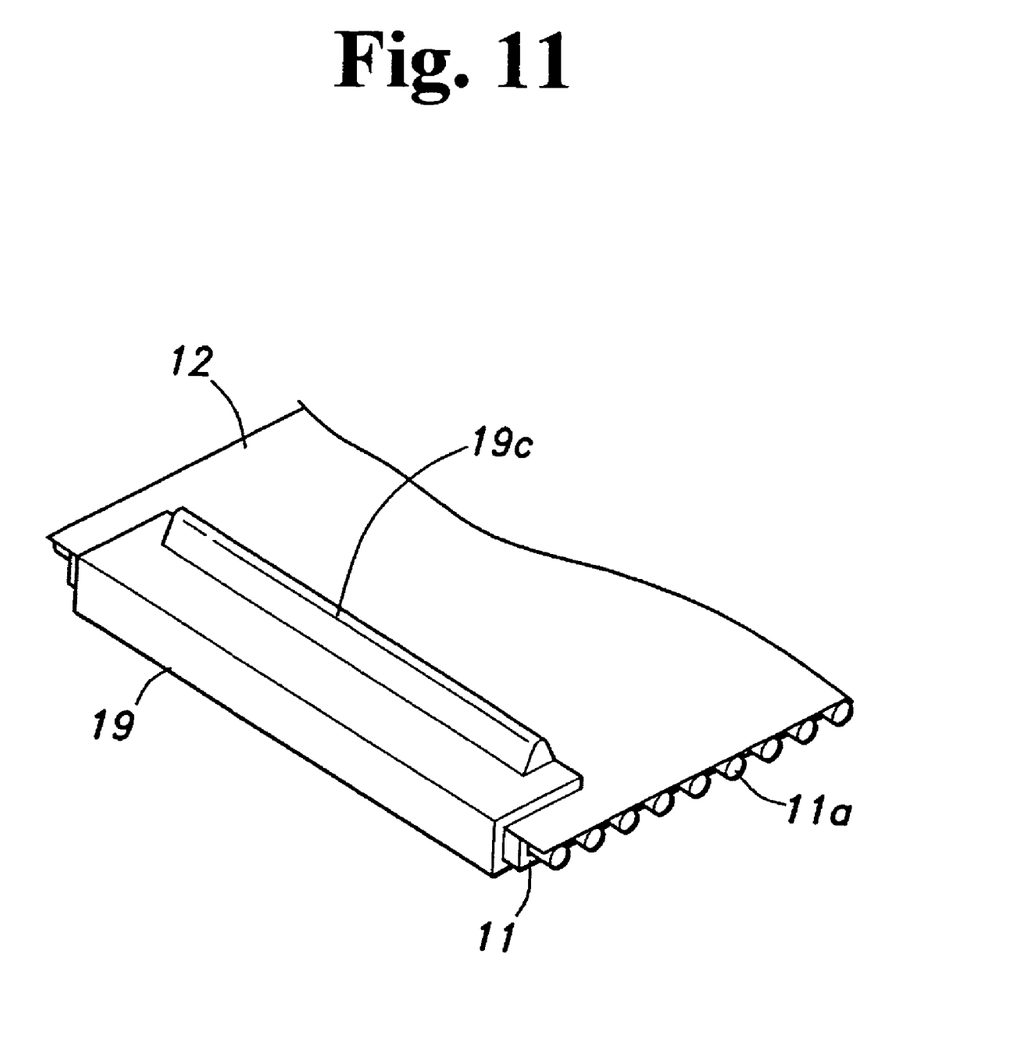
FIG. 11 is a partial perspective view showing the section where the shutter and the sheet are connected.
Figure 12:
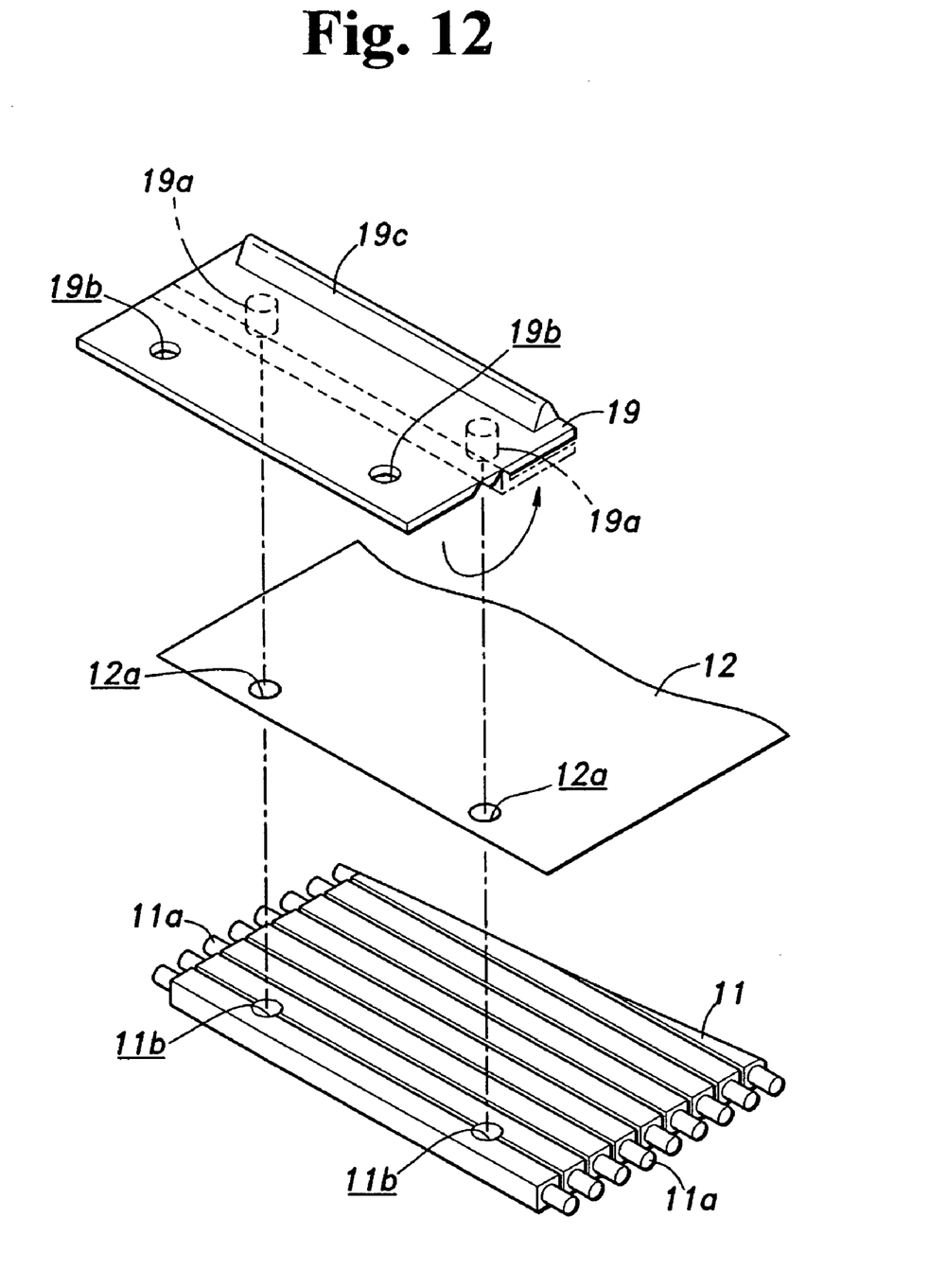
FIG. 12 is an exploded perspective view showing how the shutter and the sheet are connected.

Next, the section where the shutter 11 and the sheet 12 are connected will be explained in detail with reference to FIGS. 11 and 12. The application of this connection structure, however, is not limited to the second embodiment, and it is also applicable to the previously described first embodiment. As shown in FIG. 11, the shutter 11 and the sheet 12 are interposed together by the bracket 19 at one end, in the sliding direction. In the connection structure, as shown in FIG. 12, the bracket 19 is formed with a synthetic resin material that can be folded into a "U" shape. On one of the plate sections that will be facing each other upon folding, projections 19a are disposed, and mating holes 19b are formed on the other plate section so that the projections 19a can be press-fitted thereinto. Through holes 11b and 12a for allowing the projections 19a to pass through are respectively formed in the shutter 11 and sheet 12.

As shown in FIG. 12, the members are incorporated by laying the sheet 12 over the shutter 11, inserting the projections 19a of the bracket 19 through the respective through holes 12a and 11b, folding the bracket 19 into the "U" shape, and inserting the projecting ends of the projections 19a into the mating holes 19b. This joins the shutter 11 and the sheet 12 as a unit via the bracket 19. By doing so, the film sheet 12 can be easily united with the shutter 11. The bracket 19 in the second embodiment is provided with a handle 19c. This allows for manual operation of the door 22 via the handle 19c, even if the accessory holder lacks a mechanism for motorized operation. In that case, the handle 19c required for manual operation can be formed integrally with the bracket 19 of this connection structure; since a separate member is not required, the number of parts does not increase.

Figure 13:
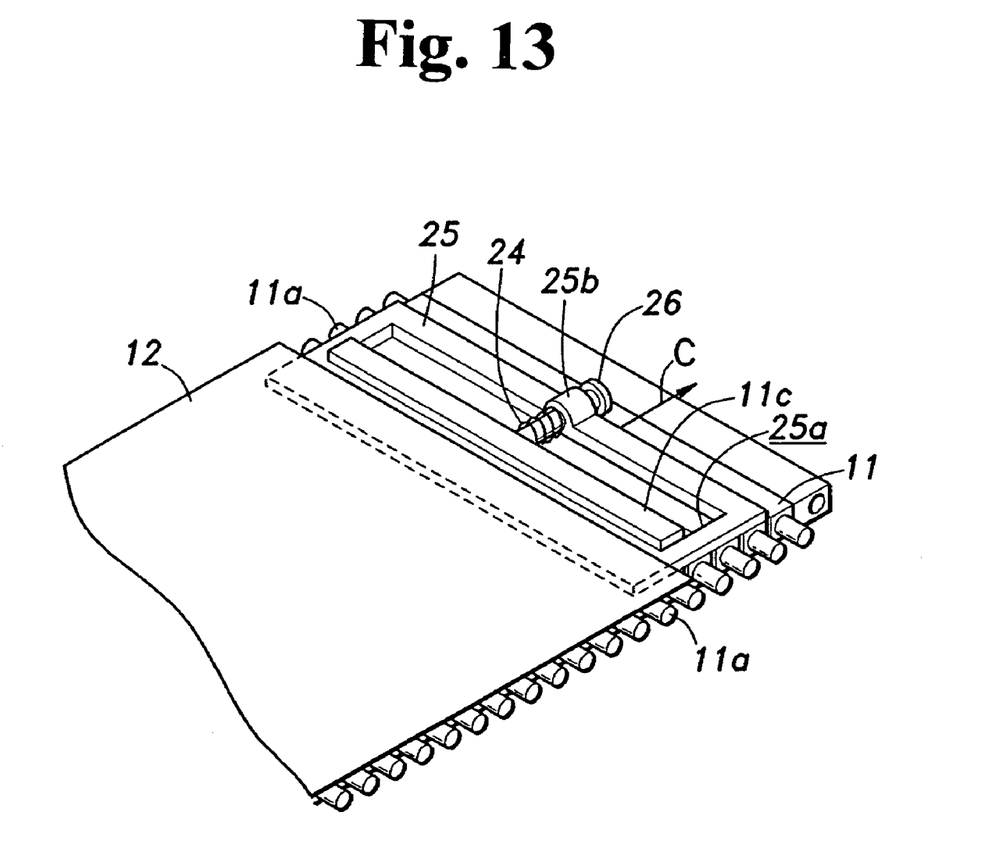
FIG. 13 is a partial perspective view showing the section where the shutter and the sheet are resiliently connected.
Figure 14:
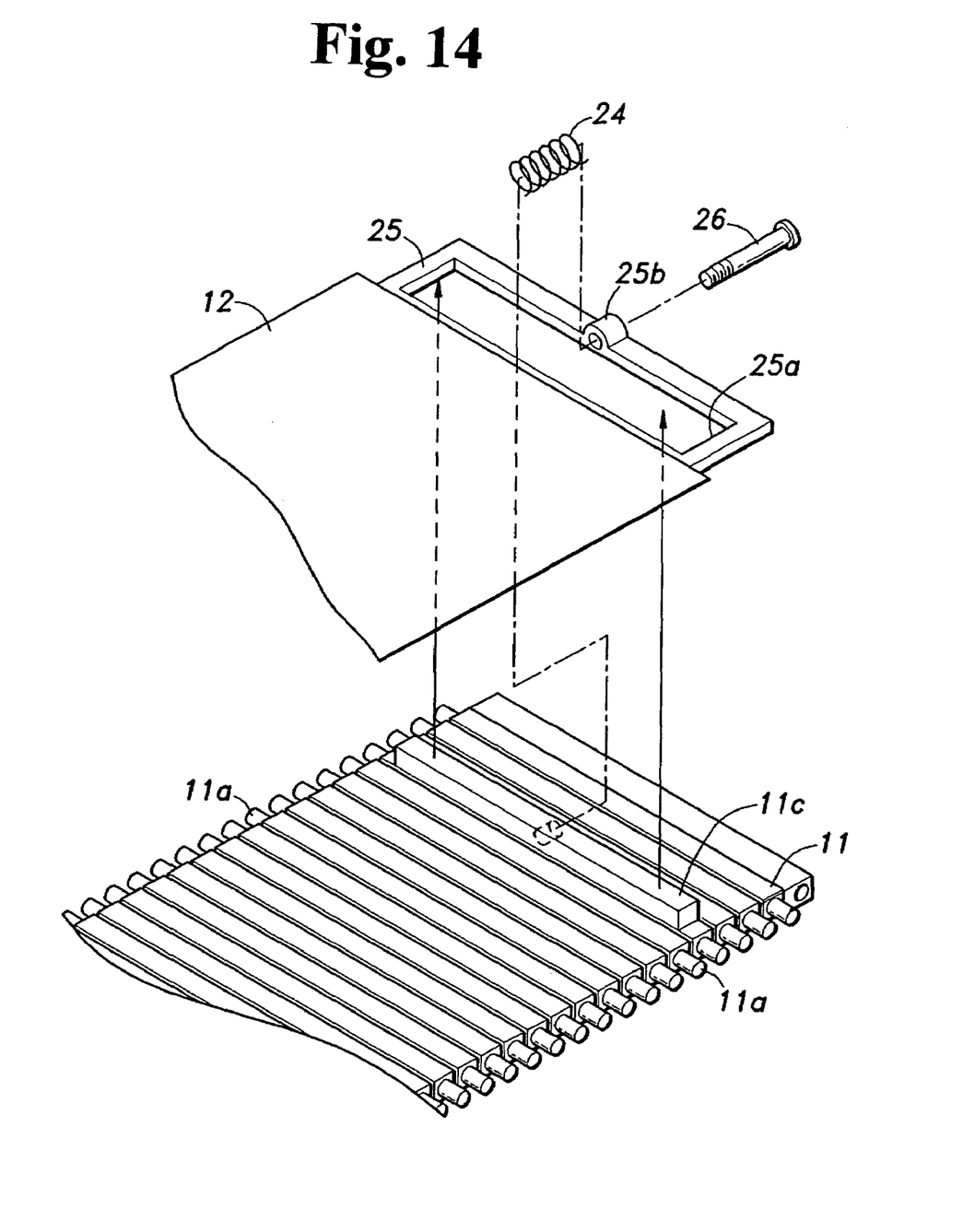
FIG. 14 is an exploded perspective view showing how the shutter and the sheet are resiliently connected.

The structure for absorbing the shifting between the shutter 11 and the sheet 12 while being slid along the curved section will be explained in detail with reference to FIGS. 13 and 14. The application of this structure is not limited to the second embodiment, and it is also applicable to the first embodiment described earlier. As shown in FIG. 13, the shutter 11 and the sheet 12 are connected via a compression coil spring 24 at the other end in the sliding direction, opposite to the aforementioned connected section. In the connection structure, as shown in FIG. 14, a thin plate protector 25 is connected to the end of the sheet 12 by, for example, adhesion, a rectangular slot 25a is disposed in the protector 25, a bar-shaped projection 11c is formed integrally with the shutter 11 in the corresponding location to be inserted into the rectangular slot 25a so as to shift position therein in the sliding direction, and a compression spring 24 is installed between the bar-shaped projection 11c and the protector 25 so as to spring-bias the two relative to each other in the sliding direction. This causes the compression coil spring 24 to generate force to move the protector 25 in the direction of arrow C relative to the bar-shaped projection 11c, to thereby spring-bias the sheet 12 in the sliding direction relative to the shutter 11, and apply tension to the sheet 12. The gap between the bar-shaped projection 11c and the rectangular slot 25a in the sliding direction is set to a length to permit the displacement of the sheet 12 caused by the shifting that occurs between the shutter 11 and the sheet 12.

A pin support 25b is disposed integrally with the protector 25 at the end that opposes the section where the sheet 12 is connected so as to slidably support the pin 26 therethrough; the pin 26 is screw connected, for example, to the bar-shaped projection 11c. This allows for the displacement of the sheet 12 while maintaining the alignment of the center line with that of the shutter 11 in the sliding direction. The compression coil spring 24 is wound around the pin 26 between the bar-shaped projection 11c and the pin support 25b to spring-bias the protector 25 relative to the bar-shaped projection 11c in the sliding direction. The spring bias is applied in the direction so as to eliminate slack that otherwise would occur in the sheet 12 in the sliding direction. There is no chance of slack or wrinkle occurring in the sheet 12 since the resilient deformation of the compression coil spring 24 in the above structure absorbs the shifting of the shutter 11 and the sheet 12 relative to each other in the sliding direction caused by the shutter 11 positioned in the inner periphery preceding the sheet 12 while passing the curved section of the aforementioned guide groove 23.

The door unit according to the present invention imposes no restrictions on the type of product, so long as the employment of a door comprising a bendable slatted door body overlaid with a flexible sheet member is permitted. The present invention, therefore, can be employed as a lid of a washing machine, for example, and is otherwise applicable to various types of apparatuses and products having a bendable, slatted door.

The disclosure of Japanese Patent Application No. 2004-241959 filed on Aug. 23, 2004 is incorporated herein.

While the invention has been explained with reference to the specific embodiments of the invention, the explanation is illustrative, and the invention is limited only by the appended claims.

What is claimed is:

1. A door unit comprising:
    an object having an opening, and a guide groove formed along the opening and having a curved section, and
    a door slidably installed to the object for selectively opening or closing the opening, said door including a bendable slatted door body at least disposed in the guide groove, and a flexible sheet member laid over said door body so as to be positioned on a surface side of said opening, only respective ends of said door body and said sheet member being connected together in the sliding direction,
    wherein said object further includes spaced separate guide grooves for guiding the sheet member independent of said door body at least in the curved section.

2. A door unit as claimed in claim 1, wherein said door further includes spring means for biasing the sheet member so as to provide tension in said sliding direction at all times.

3. A door unit as claimed in claim 2, wherein one side of the door body and one side of the sheet member are connected together, and the other side of the door body and the other side of the sheet member are connected through the spring means.

4. A door unit as claimed in claim 1, wherein a spacing between said door body and said sheet member via said guide grooves is set so as to prevent generation of noise that would otherwise be caused by said door body and said sheet member rubbing against each other, at least in said curved section, when the door body and the sheet member are being opened or closed.

5. A door unit as claimed in claim 1, wherein said guide groove and separate guide groove are formed along entire lengths of the door to be moved.

6. A door unit as claimed in claim 1, further comprising a driving unit connected to the door body for moving the door together with the sheet member.

7. A door unit comprising:
    a case having an opening at one side, and guide grooves formed at two sides of the opening to face each other, each guide groove having an inner guide and an outer guide spaced therefrom and extending parallel to each other, each of the inner guide and an outer guide having a curved section, and
    a door slidably installed to the case for selectively opening or closing the opening, said door including a bendable slatted door body comprising a plurality of slats arranged in a sliding direction to be rolled in the sliding direction and having lateral ends disposed in the inner guide, and a flexible sheet member laid over said door body to be positioned on a surface side of said opening, said flexible sheet member having lateral ends slidably disposed in the outer guides, said door body and said sheet member having ends in the sliding direction where the door body and the sheet member are connected together only at their ends.

8. A door unit as claimed in claim 7, wherein said door further includes a spring connecting the ends of the door body and the sheet member for biasing the sheet member in the sliding direction at all times.

* * * * *